June 19, 1934.  W. M. BAILEY  1,963,606
CAPACITOR AND ASSEMBLY
Filed Jan. 18, 1930
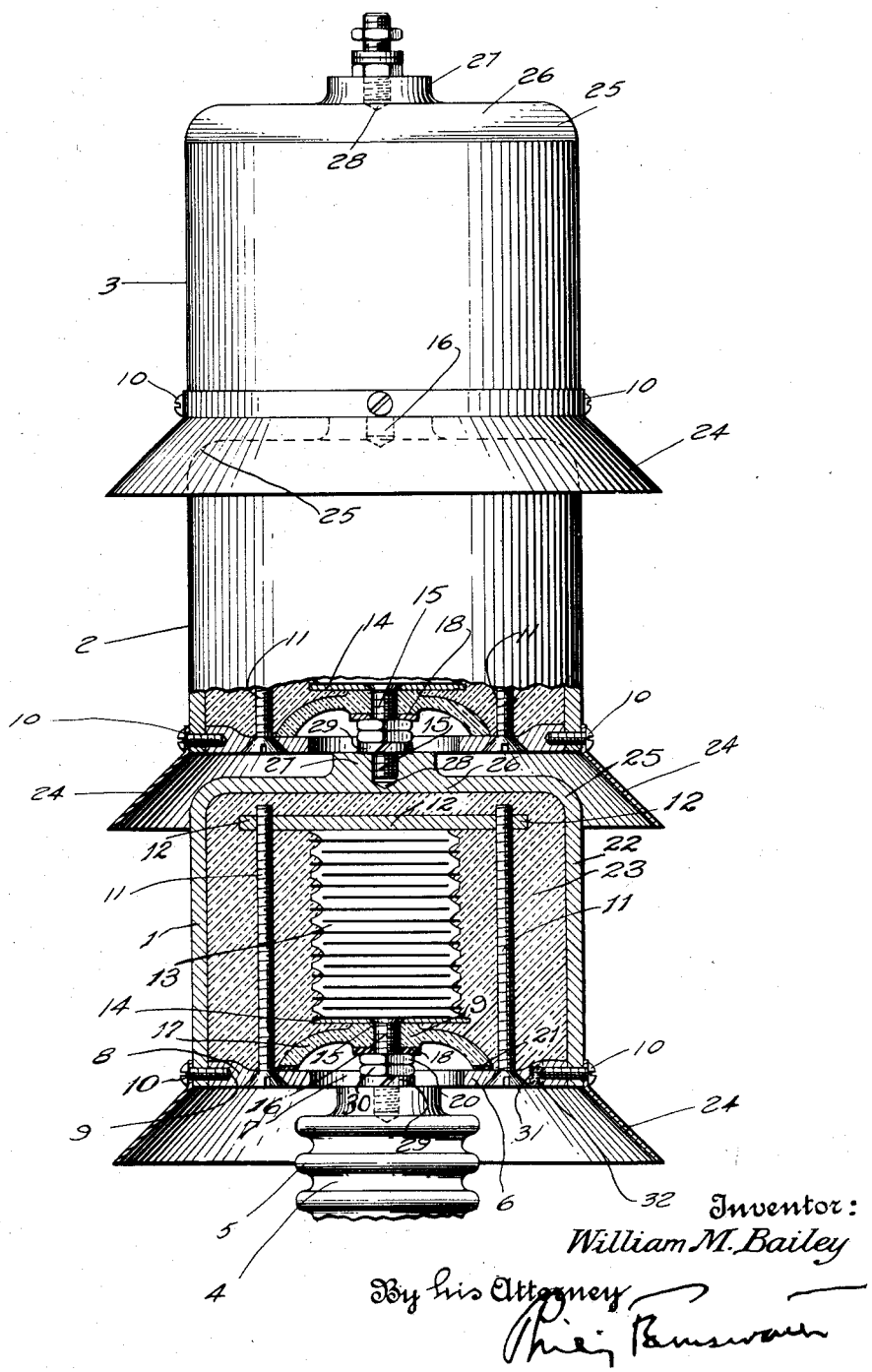
Inventor:
William M. Bailey
By his Attorney Patented June 19, 1934

1,963,606

UNITED STATES PATENT OFFICE 1,963,606

CAPACITOR AND ASSEMBLY

William M. Bailey, Lynn, Mass., assignor, by mesne assignments, to General Electric Company, a corporation of New York Application January 18, 1930, Serial No. 421,625

15 Claims. (Cl. 175—41)

This invention relates to series stack capacitors and more particularly to an improved series stack capacitor which is adapted for columnar installations.

Hitherto, it has been proposed to stack series units, which units include insulation sided casings with associated metal end pieces adapted to serve as terminals and securing means for adjacent units. These units while efficient and affording a maximum degree of electrical and mechanical efficiency are structurally large and cumbersome, requiring considerable outlays for insulation and servicing.

It is an object of the present invention to provide an improved capacitor unit which is characterized by a low-weight, and which is structurally as well as electrically efficient.

It is a further object of this invention to provide such an improved capacitor which is adapted to be disposed in a low-weight casing.

Yet another object of this invention is to provide an improved casing for columnar installations, which casing may be made of any suitable material, preferably metal as disclosed, and which is free from stack stresses.

A further object of this invention is the provision of an improved supporting member associated with a stack unit, the whole being so constituted and arranged as to concentrate the entire stack compression stresses on the supporting member within concentric areas.

These and other desirable objects and advantages of the present invention will be described in the accompanying specification and illustrated in the drawing, a certain preferred embodiment being illustrated by way of example only, for, since the underlying principles may be applied to other mechanical structures, it is not intended to be limited to the one here shown, except as such limitations are clearly imposed by the appended claims.

The drawing is a showing of a plurality of stack capacitor units shown partly in elevation and partly in vertical sections.

There is shown a series stack capacitor assembly comprising a plurality of units 1, 2 and 3 of similar construction superposed upon each other in a manner to be described in detail hereinafter.

A base support 4 of any suitable structural insulation, such as porcelain, or the like, is suitably attached to the ground, or base, not shown. These members are provided with the usual corrugations or skirts 5 to provide increased creepage surface.

Superposed on the member 4 is a capacitor unit. This unit comprises a horizontal base plate 6 having a central aperture 7 and a circumferential shoulder or thickened periferal portion 8, suitably tapped laterally as indicated at 9, to receive a plurality of securing members such as screws 10. This plate 6 is made of metal and is adapted to serve as a support and a terminal for the series-sectional high potential stack 13 shown, in a manner to be described more in detail.

The plate 6 is apertured vertically to receive screws 11, cooperating with pressure plate 12 to compress the series sectional stack 13 when disposed on a bottom pressure plate 14. This pressure plate 14 is apertured at 15 to receive a terminal stud 16, fitting into a hemispherical structural insulation member 17 of pyrex glass, porcelain, isolantite or like materials. A washer 18 of any suitable soft metal, such as lead, is positioned on the underside of the central bossed section 19 of the insulating support 17, and serves to take up the pressure against the insulator 17 imparted by screwing up locking member 20 on terminal stud 16, thereby making the pressure plate 14, terminal stud 15, and insulating support 17 substantially a mechanical unit. The member 17, due to its being protected within the inside the casing 22 above base-plate 6 and being vertically disposed above the subjacent casings is thoroughly protected from mechanical injury and is not susceptible of direct wetting by outdoor atmospheric conditions.

A soft metal washer 21 is disposed between the plate 6, and the insulating support 17, and permits the member 17 to adjust itself with respect to the plate 6 when the screws 11 are tightened up to compress the stack 13 to the desired degree. It will thus be seen, that the condenser proper comprises a base plate 6 having a central aperture 7, an insulating support 17 bridging the aperture, the support 17 being itself apertured to receive a terminal stud 15; a pressure plate 14 disposed on the insulating support 17, and in turn supporting a capacitor stack 13, a pressure plate 12 disposed on the opposite end of the stack and a plurality of tension members 11 cooperating with the base plate 6 and the last named pressure plate 12, to compress the stack 13 to the desired degree, the entire stack compression stresses being taken up by the base plate 6 in a circumferential area adjacent the central aperture thereof.

The above unit can be preformed or made up in any desired manner, and fixed for a desired capacity and is then associated with a cup-shaped protective casing 22, preferably of metal, enclosing the stack and provided, if desired, with any suitable embedding insulant 23, such as wax or other equivalent substances, introduced through a filling hole 31 in member 6, having a threaded closure 32. The casing is apertured to receive the members 10, and is provided with a depending skirt 24 secured thereto by the same securing members 10 which cooperate with the portions 8 of the base plate to give a maximum support.

The member 22 is provided at its upper portion with shoulders 25, and a closed portion or end 26 provided with an external boss 27, which is centrally tapped at 28 to receive a terminal stud 15 of a next succeeding unit. The terminal stud is screwed into or otherwise suitably associated with the insulating support 17 of an adjacent encased unit and is locked to said support by means of washer 29 and cooperating nut 30.

It will be observed that the entire stack compression stresses which may amount to several hundred pounds per square inch are completely taken care of by the base plate 6 and the associated insulating support 17 and pressure plates 12 and 14. This compact unitary construction is self-sufficient, both electrically and mechanically, and as a result, the base plate 6 may be made thick enough to take care of the stack compressions. The casings 22 on the other hand, being relieved of any structural stress requirements of the stack compression, are required only to support the dead-weight of the stacked units. This weight requirement is relatively easily taken care of by the improved construction of the casings 22, including the broad supporting boss 27 and the shouldered portions 25, together with the side of 22, with the result that the thickness of the metal, which is used for the cup shaped casing 22 may be appreciably less than that of the base plate 6 so that desirable economies in the manufacture and installation of the units and columnar assemblies may be made without sacrificing any of the desirable electrical and mechanical features and efficiency contemplated.

The base plates 6 may be made of structural steel or other metals having the desired mechanical rigidity, while the casing may be desirably made by deep drawing of steel cups 22 and welding supporting bosses 27 thereto, or they may be made by die-casting aluminum, zinc, or brass compositions, all of which methods will give efficient results. However, owing to the considerably greater strength of a drawn structural steel member or drawn aluminum or other non-ferrous metal member, such as copper, brass, etc. drawn members are to be preferred to cast members of any suitable material, as it is well known that castings require considerably greater thickness than sheet metal members to secure the same structural efficiency.

While the cupped casing 22 has been described as being made of metal, it will, of course, be appreciated that any suitable structural insulation such as porcelain, isolantite, hard rubber, bakelite (laminated or not), may be formed into the desired shape and used for the purposes described. These materials may be relatively thin due to the fact that they are not exposed to live stresses, but are intended to support merely dead weights, and further desirable economies may be secured by their use under given conditions.

Where all-metal constructions are contemplated, the metallic casing 22 in conjunction with the depending skirts or rain shields 24, which are preferably made of metal, may provide a continuous external discharge path, the sole requisite being that the gap or space between members 24 and the shoulders 25 of the casings be adjusted to take care of the desired flash-over voltage.

The electrical circuit of the installation comprises a bottom terminal 15 of one potential, the current from the opposite or upper end of the stack 13 passing through the pressure plate 12 and through the tension members 11 to the base plate 6 and thence to the casing 22, thus making, in effect, the terminal stud 15, and the casing 22 the two terminals of each unit capacitor. Due to the aperture 7 in the base plate 6, the insulating member 17 is subjected to a uniform electrostatic stress, as well as a uniform mechanical stress by 11, 6 and 14, and the necessary creepage distance for any given current efficiency may be secured by increasing the height of the insulating support 17 and the diameter of aperture 7 between terminal 15 and base plate 6.

It will thus be seen that there has been provided an improved capacitor unit and capacitor assembly adapted for use in columnar installations in carrier-current constructions and for similar purposes, the capacitor units proper being standard and susceptible of manufacture and tests prior to their association with the casings 22, the units being self-contained with respect to pressure-resisting members and the casings being made of metal or structural insulating material as desired and being required to support the dead weight of the columnar assembly irrespective of stresses involved in clamping.

What is claimed is:

1. A columnar capacitor assembly, comprising a plurality of capacitor units, a metallic casing for each unit, each casing being formed with a closed end and sides and an open end, a closure for the open end of each casing in the column which is adjacent the closed end of another casing in the column, said closure including a centrally apertured metal plate secured and electrically connected to the metallic sides of the casing; a stack inside each casing and electrically connected between its own casing by way of the apertured plate therefor, on one hand, and on the other, the adjacent closed end of an adjacent capacitor unit in the column; and metallic means constituting said electrical connection to said adjacent closed end and mechanically connecting said closed end to said first capacitor unit and holding both units in the columnar assembly.

2. A columnar capacitor assembly including a plurality of separate capacitor units each including a unit capacity and a conductively unitary metallic casing therefor, the casings being arranged end to end in columnar assemblage, and the end of one casing adjacent the end of another being formed with a perforation; the capacities inside said individual perforated casings having one polarity connected to their respective metallic casings; and a connecting lead extending thru said casing-perforation from the other polarity of the interior capacity to the casing of the adjacent unit; said connecting lead being in the form of a strong metallic member mechanically holding the two complete capacitor units in said columnar assembly; and said casing-perforation being sufficiently large to insulate the casing from said strong metallic member extending thru the perforation.

3. A capacitor unit adapted for columnar capacitor assembly of similar units and including conductively unitary metallic casing having an opening formed in one end; an interior metallic pressure-plate inside said casing paralleling said casing-end; means insulating said pressure-plate from said casing-end; a capacitor-stack mounted at one end on said pressure-plate; and a terminal stud having one end mounted in said interior pressure-plate, and electrically connected to one polarity of the stack and extending out of the casing by way of said casing-opening, said opening being sufficiently large to insulate said stud from the casing in columnar assemblage; and said stud extending out beyond the casing for connection to the similar metallic casing of a similar capacitor unit in columnar assemblage; the opposite end of said casing being formed with an interiorly threaded portion alined with said terminal stud and thereby adapted to receive a similar terminal stud of a similar capacitor-unit in columnar assemblage; said terminal stud being adapted to mechanically hold together two similar capacitor units adjacent one another in columnar assemblage, and to connect together electrically the capacities inside the casings of such capacitor units.

4. A columnar capacitor assembly comprising a plurality of capacitor units each including a stack, a metallic casing therefor, and means clamping each stack independently, each casing being formed with a closed end having a centrally disposed internally threaded boss and an open end, said clamping means being independent of said casing; a metallic closure for the open end of the casing; and combined terminals and casing supports secured to said bosses on the closed ends of the casings and connected to the enclosed plurality of clamped stacks.

5. A capacitor unit for a columnar capacitor assembly, comprising a capacitor stack, a metallic casing surrounding the stack and formed with an open end, and including a centrally apertured plate secured adjacent the open end of the casing, a bridge-shaped insulating member inside the casing arranged with its rim resting on said plate and its convex side supporting the stack; means clamping said stack and bridge member to said plate; and a terminal stud extending thru said bridge-member and plate.

6. A capacitor unit comprising a stack of dielectric and armature members, a casing, a closure for the casing and including an apertured metallic member having its rim secured and electrically connected to said casing, and a structural insulating member of vitreous material substantially entirely within the casing for transmitting compressive stress to said stack, said insulating member being arched inwardly of the casing and located at the open end thereof closing the aperture in said metallic closure member, with its rim resting on the inside of said apertured metallic member, and supporting said stack; and means clamping said stack against said insulating member and the latter against said apertured metallic member, said clamping means and said rim of the insulating member acting in opposite directions against said apertured metallic member.

7. In a capacitor, a capacitor stack, a plate member, an arched vitreous member interposed between one end of the stack and the plate with its rim resting on one face of the plate and its other side against one end of the stack; and threaded metallic members extending thru the plate and abutting the other face of the plate and having mechanical and electrical connection with the other end of the stack and compressing the stack against said arched vitreous member.

8. In a columnar capacitor assembly, a plurality of capacitor stacks, centrally apertured metallic plates, and hemispherical members of structural insulating material, each interposed between one side of successive pairs of plates and stacks and sealing off the central apertures of the plates, with its rim resting on said plate and its other side supporting its associated stack; and means abutting the other sides of each plate adjacent the rims of the hemispherical members, said means extending thru the plates and clamping the stacks against said respective insulating members; and means mechanically connecting together the metallic plates of successive unit capacitors by way of said clamping means; said insulating members electrically separating said successive plates.

9. A capacitor assemblage comprising a plate, a capacitor stack, an hemispherical member of structural vitreous material interposed between the stack and plate, its rim resting on the plate and its other side supporting the stack; metallic means cooperating with the stack and the plate adjacent the vitreous member and clamping the stack against said vitreous member, a metallic casing secured to the plate and surrounding the stack; and a terminal-stud projecting from the stack thru said vitreous member; said casing having a substantially thick portion constructed for reception and supporting of a similarly located terminal stud of an adjacent capacitor assemblage and holding the two capacitor assemblages in alinement in columnar assemblage; said metallic casings electrically connecting the stud of one stack to the stack inside an adjacent casing by way of a clamping means.

10. A columnar capacitor assemblage comprising apertured metallic plates; vitreous members formed with central apertures and in bearing engagement with said plates; stacks having an end positioned against the vitreous members; means cooperating with the apertured plates adjacent the zones of said bearing engagements to clamp the stack against the other sides of the vitreous members; a metallic structure electrically connected to one stack and extending through the aperture of the vitreous member supporting one stack, and a metallic structure mechanically and electrically connected to the clamping means for the other stack; said metallic structures having constructions mechanically and electrically connecting the two stacks together in the columnar assemblage; said vitreous member cooperating with said metallic structures in holding the parts in rigid relations and causing operative series electrical connection of the two stacks.

11. A columnar capacitor assemblage comprising stacks and centrally apertured plates; vitreous members formed with apertures and in bearing engagements with the plates adjacent the openings therein and supporting the stacks; metallic casings secured to the plates and surrounding the stacks; and metallic connecting means extending from the stack in one casing through the aperture of the vitreous member supporting said stack; said casings being arranged in columnar assemblage; and said metallic connecting means from one stack and the adjacent portion of the adjacent casing having cooperating constructions mechanically supporting and electrically connecting the two successive stacks and casings in the columnar assemblage; said vitreous members preventing electrical connection of the casing enclosing one of the stacks with the stack enclosed by the other casing.

12. A capacitor casing for columnar capacitor assemblies comprising a metallic container formed with closed and open ends, a stack therein; a centrally apertured metallic closure attached to the container at its open end and enclosing the stack; a metallic member projecting from the stack thru the closure said projecting member and the closed end of the metallic container having constructions cooperating with duplicate members of adjacent capacitors alined in columnar assemblage; said metallic container electrically connecting its enclosed stack with a stack in an adjacent container; and an insulating member inside the container and insulating the stack in the container from the stack enclosed by an adjacent container.

13. A capacitor for columnar capacitor assemblies comprising a stack a metallic container for the stack and formed with an open end and a closed end having a centrally disposed threaded boss, a metallic closure attached to the open end, and a threaded stud electrically connected with the enclosed stack, extending thru said metallic closure and in aligned relation with said threaded boss; said metallic container electrically connecting its enclosed stack with a stack in a container adjacent at one end in the column; and an insulating member inside the container and insulating the container from the other end of its enclosed stack.

14. A capacitor unit adapted for pluralized stacking of duplicate units end to end in column and for that purpose including first, a casing having an open end and a closed end and constructed of metal and sustaining the dead weight of pluralized units stacked end to end in column; second, a metallic closure-plate having a large central aperture and periferally secured to such metallic casing at the open end thereof and partially closing said open end; the capacitor stack being arranged longitudinally in the casing and in alinement with said plate-aperture; an insulating member located inside the casing, bearing against the inner face of said closure-plate radially beyond its central aperture and in position in line with the stack and closing said plate-aperture; a metallic compression-plate inside the casing and at the other end of the stack, said interior insulating member receiving stack-compression stresses and transmitting them to portions of said closure plate between its perifery and its large central aperture; and tensioning members extending from said interior compression plate thru the interior of the stack-enclosure and out thru said portions of the closure plate and bearing against the outer surface thereof transmitting stack-tension stresses thereto in opposition to the compression stresses transmitted by the interior insulating member to the same portions but to the opposite face of the closure-plate, thereby freeing the casing from stack-clamping stresses; said casing being internally threaded in line with said closure-plate aperture; said interior insulating member having an opening in line with said closure-plate aperture; one end of the enclosed stack being electrically connected to the metallic casing by way of the interior compression plate and tensioning members and by said closure-plate; and the other end of the stack, nearer the closure-plate, being insulated from the casing by said closure-aperture and interior insulating member; all whereby plural units can be secured in place together end to end in column arrangement and electrically connected in series by means of threaded studs screwed in said alined threaded openings in the casing and extending through the alined openings in the interior insulating member and the closure plate.

15. A capacitor unit in accordance with claim 3 and further characterized by a construction of the metallic casings including internally threaded outward embossments and a shouldered construction of the ends and adjacent sides of the casings increasing the resistance of comparatively thin-walled metallic casings to the dead weight of a column of the units.

WILLIAM M. BAILEY.